(12) United States Patent
Kim

(10) Patent No.: US 9,677,694 B2
(45) Date of Patent: Jun. 13, 2017

(54) DIVERGENCE TYPE GEOTEXTILE TUBE FILLING PORT

(71) Applicant: INDUSTRY-ACADEMIC COOPERATION FOUNDATION, KUNSAN NATIONAL UNIVERSITY, Jeollabuk-do (KR)

(72) Inventor: Hyeong-joo Kim, Jeollabuk-do (KR)

(73) Assignee: INDUSTRY-ACADEMIC COOPERATION FOUNDATION, KUNSAN NATIONAL UNIVERSITY, Jeollabuk-Do (KR)

( * ) Notice: Subject to any disclaimer, the term of this patent is extended or adjusted under 35 U.S.C. 154(b) by 0 days.

(21) Appl. No.: 14/420,607

(22) PCT Filed: Jul. 3, 2014

(86) PCT No.: PCT/KR2014/005957
§ 371 (c)(1),
(2) Date: Feb. 9, 2015

(87) PCT Pub. No.: WO2015/002482
PCT Pub. Date: Jan. 8, 2015

(65) Prior Publication Data
US 2015/0198268 A1  Jul. 16, 2015

(30) Foreign Application Priority Data

Jul. 4, 2013 (KR) .................. 10-2013-0078353
Jul. 31, 2013 (KR) .................. 10-2013-0090597

(51) Int. Cl.
*F16L 11/02* (2006.01)
*B65D 88/54* (2006.01)
*E02B 3/12* (2006.01)

(52) U.S. Cl.
CPC .............. *F16L 11/02* (2013.01); *B65D 88/54* (2013.01); *E02B 3/127* (2013.01)

(58) Field of Classification Search
USPC .......................... 383/36, 904; 141/390, 391
See application file for complete search history.

(56) References Cited

U.S. PATENT DOCUMENTS 2,387,324 A * 10/1945 Glickman ............... F01P 11/06
   134/177
3,464,584 A *  9/1969 McNally ............... B65D 88/54
   220/86.1

(Continued)

FOREIGN PATENT DOCUMENTS

JP          09268522        10/1997
JP         2005104711         4/2005
(Continued)

OTHER PUBLICATIONS

International Search Report cited in PCT/KR2014/005957 dated Jul. 29, 2014.

*Primary Examiner* — Kyle Armstrong
(74) *Attorney, Agent, or Firm* — Workman Nydegger

(57) ABSTRACT

A divergence type geotextile tube for filling a port includes a main body to which a main hose for injecting dredge soil is connected, the main body having a lower portion inserted in the tube structure, and an outlet provided in the main body to exhaust the injected dredge soil in a lateral direction, in a state of being inserted in the tube structure.

14 Claims, 11 Drawing Sheets

(56) References Cited

U.S. PATENT DOCUMENTS

| | | | | |
|---|---|---|---|---|
| 3,645,110 | A * | 2/1972 | Mann | B60H 1/3205 |
| | | | | 62/217 |
| 4,966,491 | A * | 10/1990 | Sample | E02B 3/04 |
| | | | | 405/15 |
| 7,943,039 | B1 * | 5/2011 | LeBuffe | B01D 21/0021 |
| | | | | 210/154 |
| 2003/0071459 | A1 * | 4/2003 | Ozawa | B67D 7/007 |
| | | | | 285/192 |
| 2011/0083768 | A1 * | 4/2011 | Sims | B65D 88/54 |
| | | | | 141/2 |
| 2014/0010601 | A1 * | 1/2014 | Bradley, Sr. | E02B 3/06 |
| | | | | 405/302.7 |
| 2014/0341652 | A1 * | 11/2014 | Besseling | C02F 11/128 |
| | | | | 405/50 |

FOREIGN PATENT DOCUMENTS

| | | |
|---|---|---|
| KR | 200416537 | 5/2006 |
| KR | 20110085080 | 7/2011 |

* cited by examiner

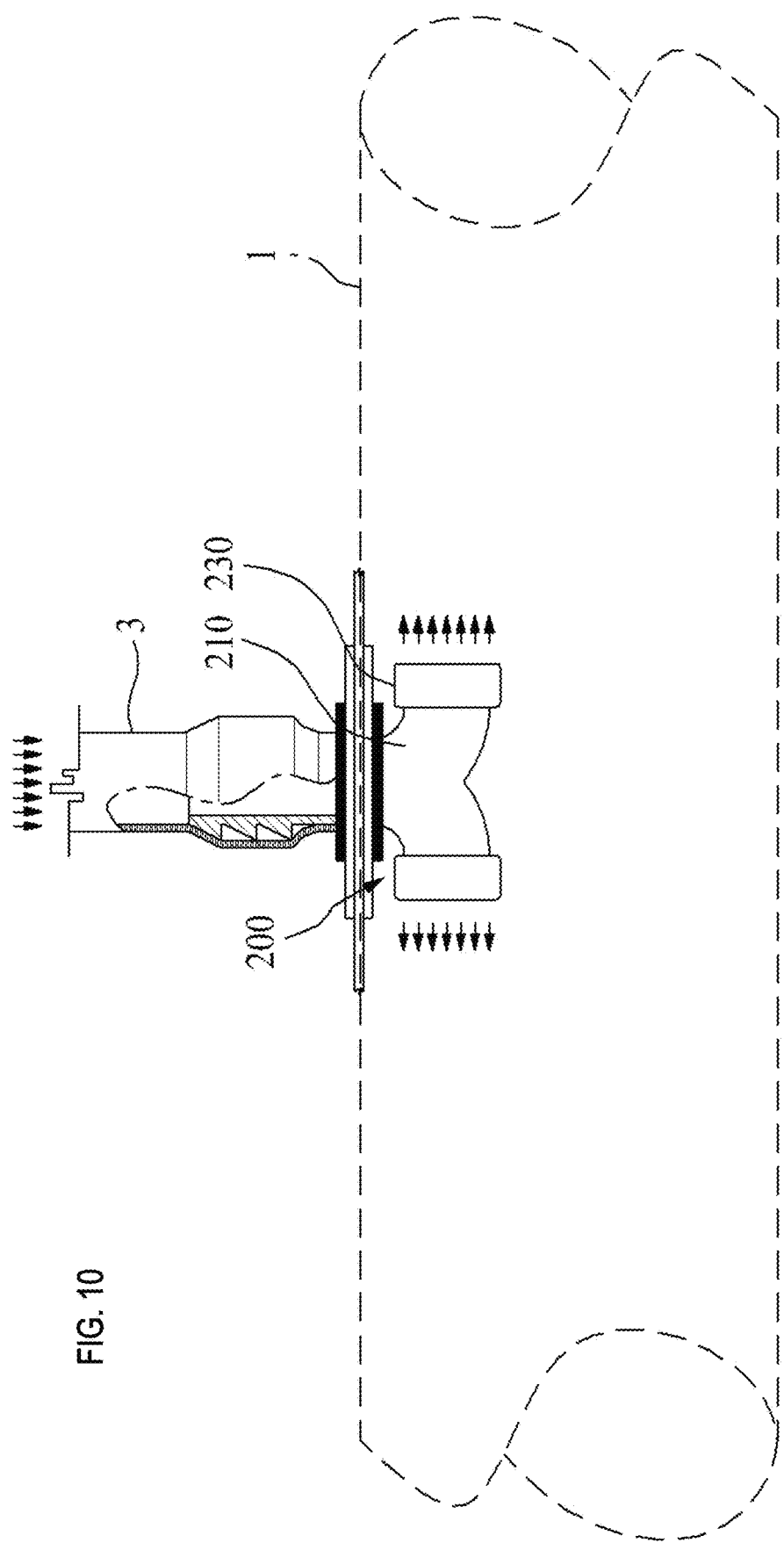

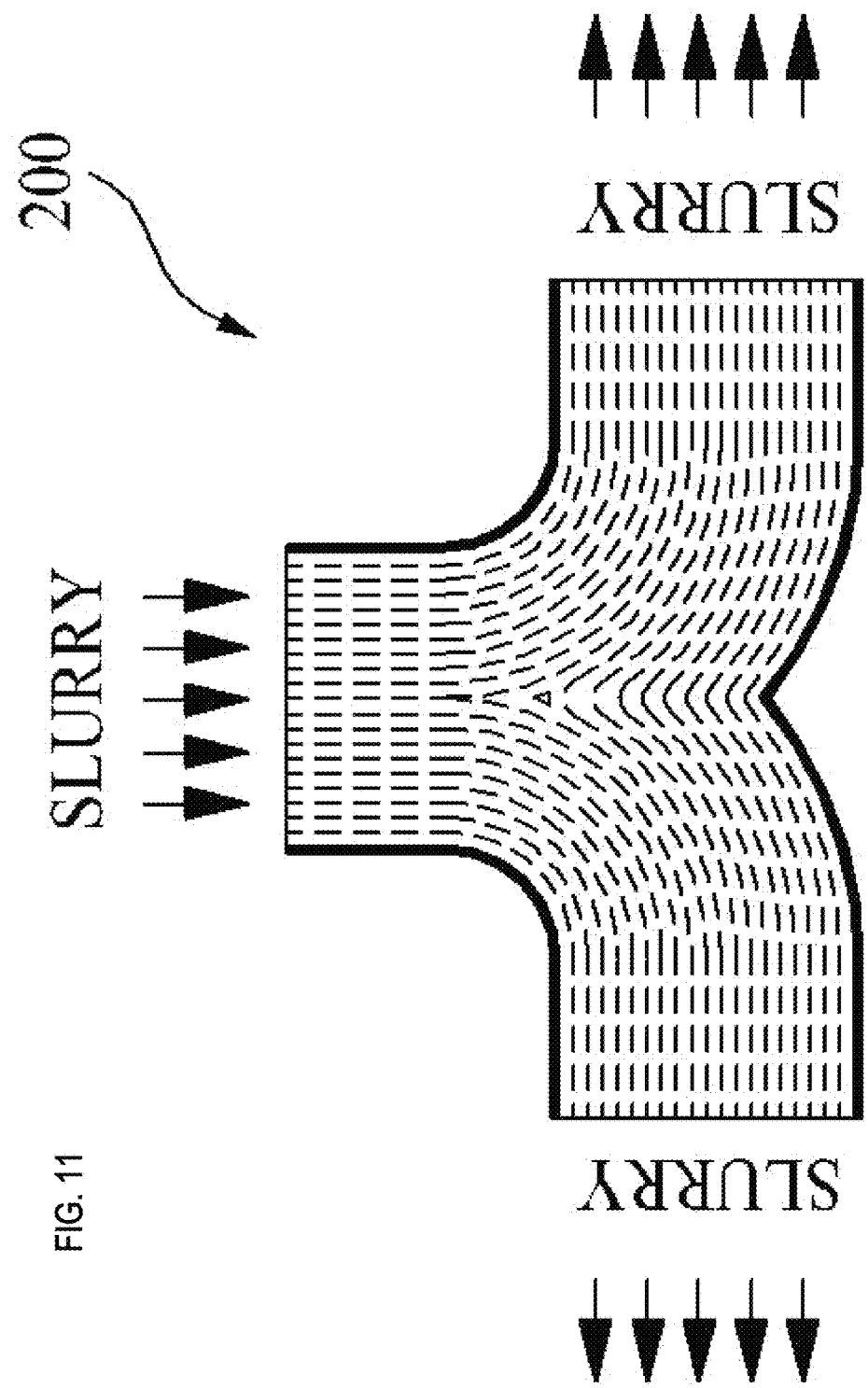

DIVERGENCE TYPE GEOTEXTILE TUBE FILLING PORT

BACKGROUND OF THE DISCLOSURE

Field of the Disclosure

Exemplary embodiments of the disclosure relate to a structure for filling a tube structure, more particularly, to divergence type filling port which will enable the slurry to be deflected into two opposing directions along the longitudinal axis of the geotextile tube and enabling an even distribution of geotextile tube height throughout.

Discussion of the Background

The pumping pressure is an important factor in designing geotextile tubes but improper application during filling will consequently result to geotextile rapture or failure. Since a higher pumping pressure is desirable at times to achieve an optimum tube height, another method for slurry filling is needed.

The conventional slurry filling practice generally uses a straight type filling port 10 (I-type inlet) connected to a delivery hose 3 provided with slurry from outside as shown in FIG. 1.

During injection the slurry will be filled on the geotextile tube 1 in the downward direction at a high velocity as shown in FIG. 2. A phenomenon called the hydraulic jump will occur as the pressurized slurry crashes at the bottom of the geotextile tube 1. The turbulent wave caused by the collision of slurry and the bottom of the geotextile tube will be dispersed sideways, both in the transverse and longitudinal directions. In the transverse plane where the span is less than the longitudinal plane, the turbulent wave caused by the pumping action will greatly affect and increase the circumferential force rather than the axial force of the geotextile tube. Excessive pumping pressure will cause the geotextiles to overstress which will lead to rapture or failure.

Moreover, the experiments conducted on a transparent vinyl geotubes (referred to as "geovinyl-tube") exhibits a non-uniform height distribution of sediments along the tube (see FIG. 3). The circumferential scale height (measured by placing tailors tape around the body of the geotextile tube and designating the mid bottom of the tube as reference "0", the tapes are placed at equal intervals along the tube to measure the height of sediments in the geotextile tube after each filling phase. The deposition height of sediments using I-type inlet varies along the geotextile tube 1. After the last filling phase, it produced a wavy top surfaced geovinyl-tube. The actual soil deposition is shown in FIG. 3.

SUMMARY OF THE DISCLOSURE

Exemplary embodiments of the present disclosure provide a tube structure having a structure configured to prevent damage thereto when dredge soil is injected therein.

Exemplary embodiments of the present disclosure also provide a tube structure of which both several sections with respect to an inlet are prevented from being blocked with dredge soil.

Exemplary embodiments of the present disclosure also provide a tube structure which may inject dredge soil broadly to reduce the number of inlets and to increase an injection interval between the inlets.

Exemplary embodiments of the present disclosure also provide a tube structure having enhanced injection efficiency, construct ability and economic efficiency.

Exemplary embodiments of the present disclosure disclose a T-type geotextile tube for filling a port includes a main body to which a main hose for injecting dredge soil is connected, the main body having a lower portion inserted in the tube structure; and an outlet provided in the main body to exhaust the injected dredge soil in a lateral direction, in a state of being inserted in the tube structure.

The outlet may be provided in a perpendicularly bent direction with respect to the main body.

The outlet may be formed of a flexible material.

A plurality of outlets may be provided in a portion of the main body.

A pressure sensor may be further provided in the outlet to measure a pressure around the outlet, when contacting with the dredge soil injected in the tube structure.

The outlet may be formed in a bellows shape to form a preset turbulence, when the outlet is expanded by an injection pressure of the dredge soil.

The outlet may be downwardly inclined a preset angle in a lateral direction from the main body.

A connected portion between the main body and the outlet may be gently curved.

The T-type geotextile tube for filling a port according to the embodiments of the disclosure has following effects.

First, the dredge soil may be injected in the tube structure in the lateral direction which is the longitudinal direction of the tube structure. Accordingly, injection efficiency of the dredge soil may be enhanced.

Second, in the embodiments of the disclosure, the dredge soil is injected in the lateral direction and the dredge soil is prevented from blocked in the tube structure. Also, the injection distance of the dredge soil is increased and the distance between the inlets may be maximized.

Third, the injected dredge soil is injected, while generating a turbulence. Accordingly, the dredge soil piled up in several sections in the tube structure may be minimized.

Last, the dredge soil can be injected efficiently. The construct ability may be enhanced and the economic feasibility may be enhanced.

It is to be understood that both the foregoing general description and the following detailed description are exemplary and explanatory and are intended to provide further explanation of the disclosed subject matter as claimed.

BRIEF DESCRIPTION OF THE DRAWINGS

The accompanying drawings, which are included to provide a further understanding of the disclosed subject matter and are incorporated in and constitute a part of this specification, illustrate exemplary embodiments of the disclosed subject matter, and together with the description serve to explain the principles of the disclosed subject matter.

FIG. 10 is a diagram illustrating the dredge soil injected via a divergence type inlet for filling slurry in a geotextile tube according to a second embodiment of the disclosure; and FIG. 11 is a diagram schematically illustrating slurry flowing when using the divergence type inlet for filling the slurry in the geotextile tube according to the second embodiment.

DETAILED DESCRIPTION OF THE ILLUSTRATED EMBODIMENTS

Figure 1:
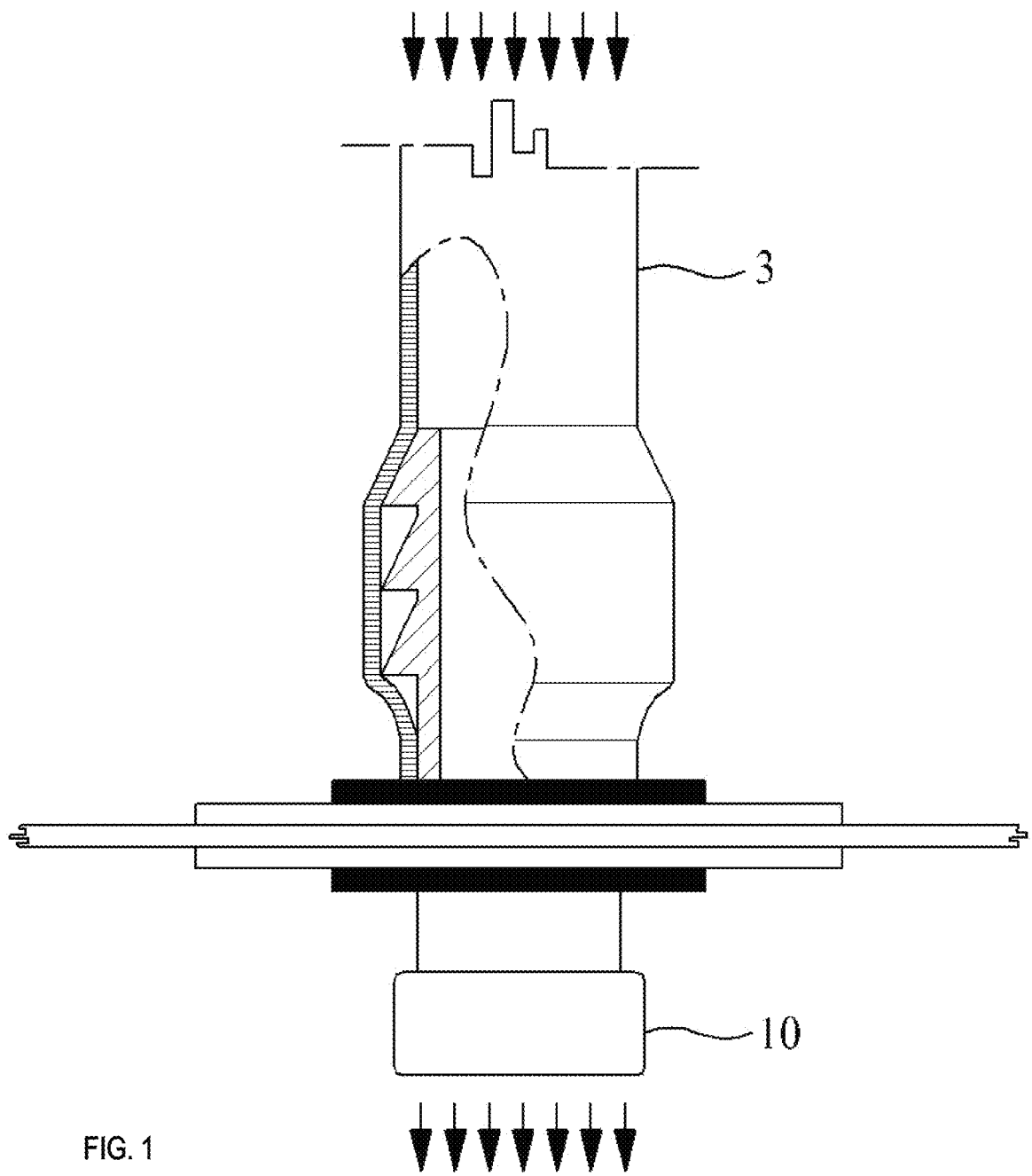
FIG. 1 is a diagram illustrating an I-type inlet for filling slurry in a conventional geotextile tube.
Figure 2:
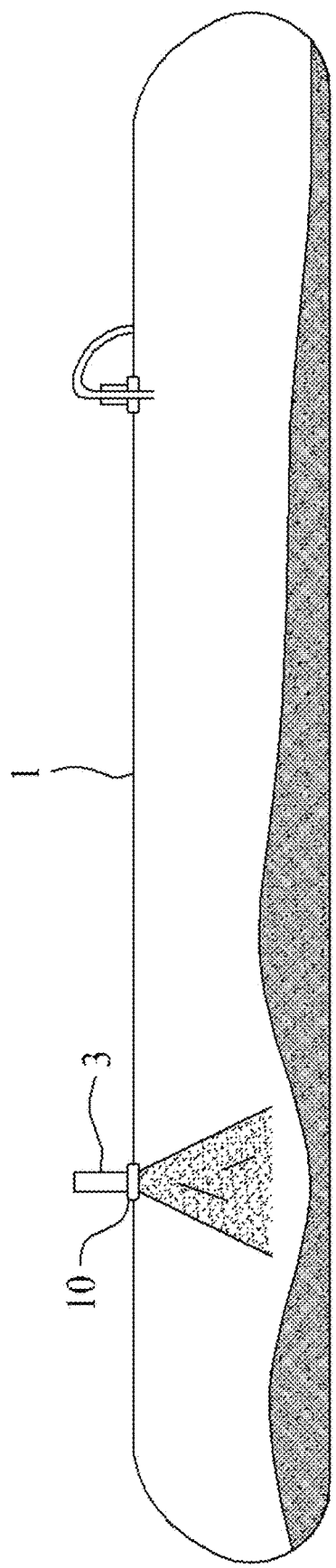
FIG. 2 is a sectional diagram illustrating that dredge soil is injected after the I-type inlet for filling the slurry in the conventional geotextile tube is connected.
Figure 3:
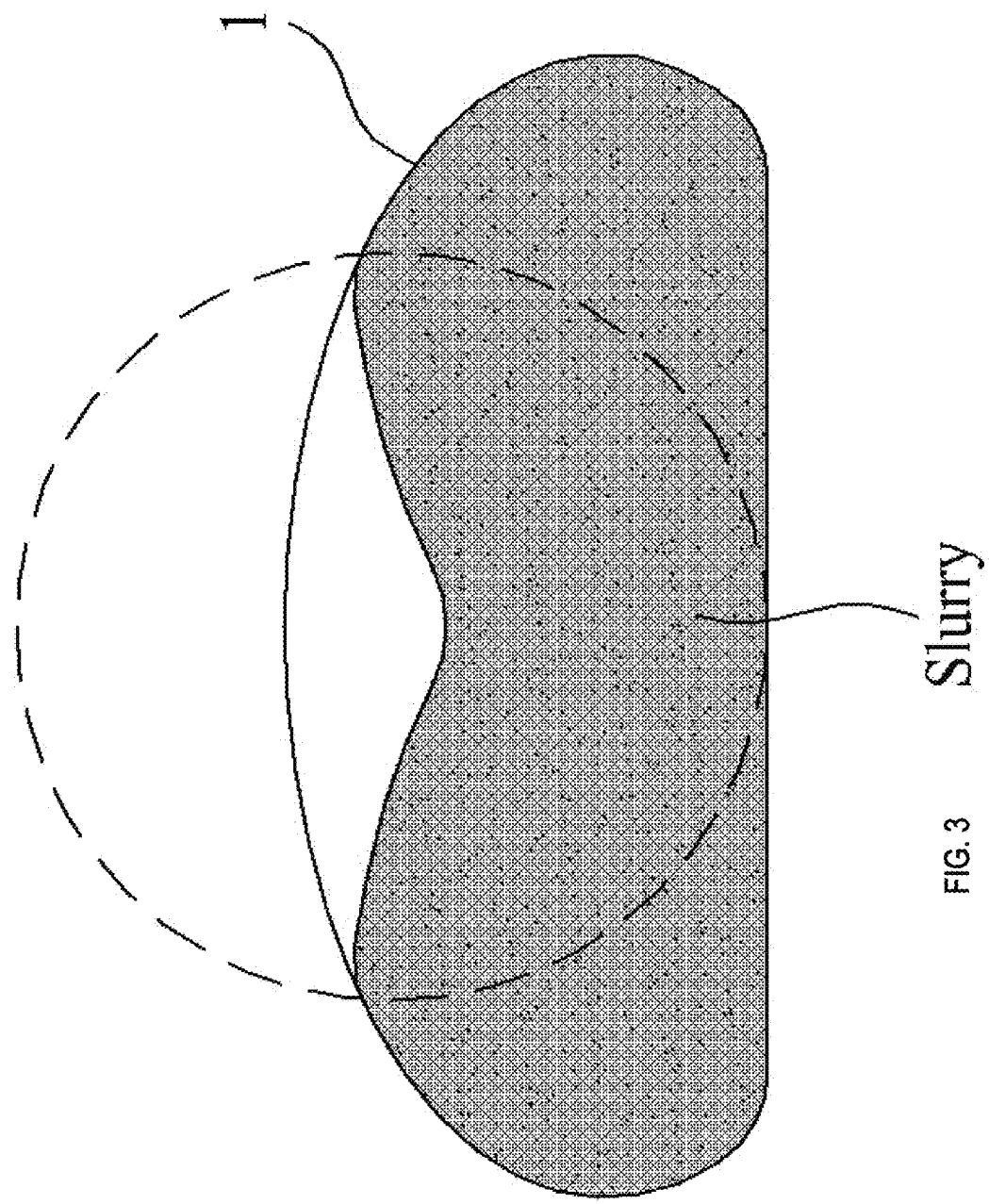
FIG. 3 is a traverse sectional diagram illustrating the dredge soil injected via the I-type inlet for filling the slurry in the conventional geotextile tube.

Exemplary embodiments of the disclosed subject matter are described more fully hereinafter with reference to the accompanying drawings. The disclosed subject matter may, however, be embodied in many different forms and should not be construed as limited to the exemplary embodiments set forth herein. Rather, the exemplary embodiments are provided so that this disclosure is thorough and complete, and will convey the scope of the disclosed subject matter to those skilled in the art. In the drawings, the size and relative sizes of layers and regions may be exaggerated for clarity. Like reference numerals in the drawings denote like elements.

Figure 4:
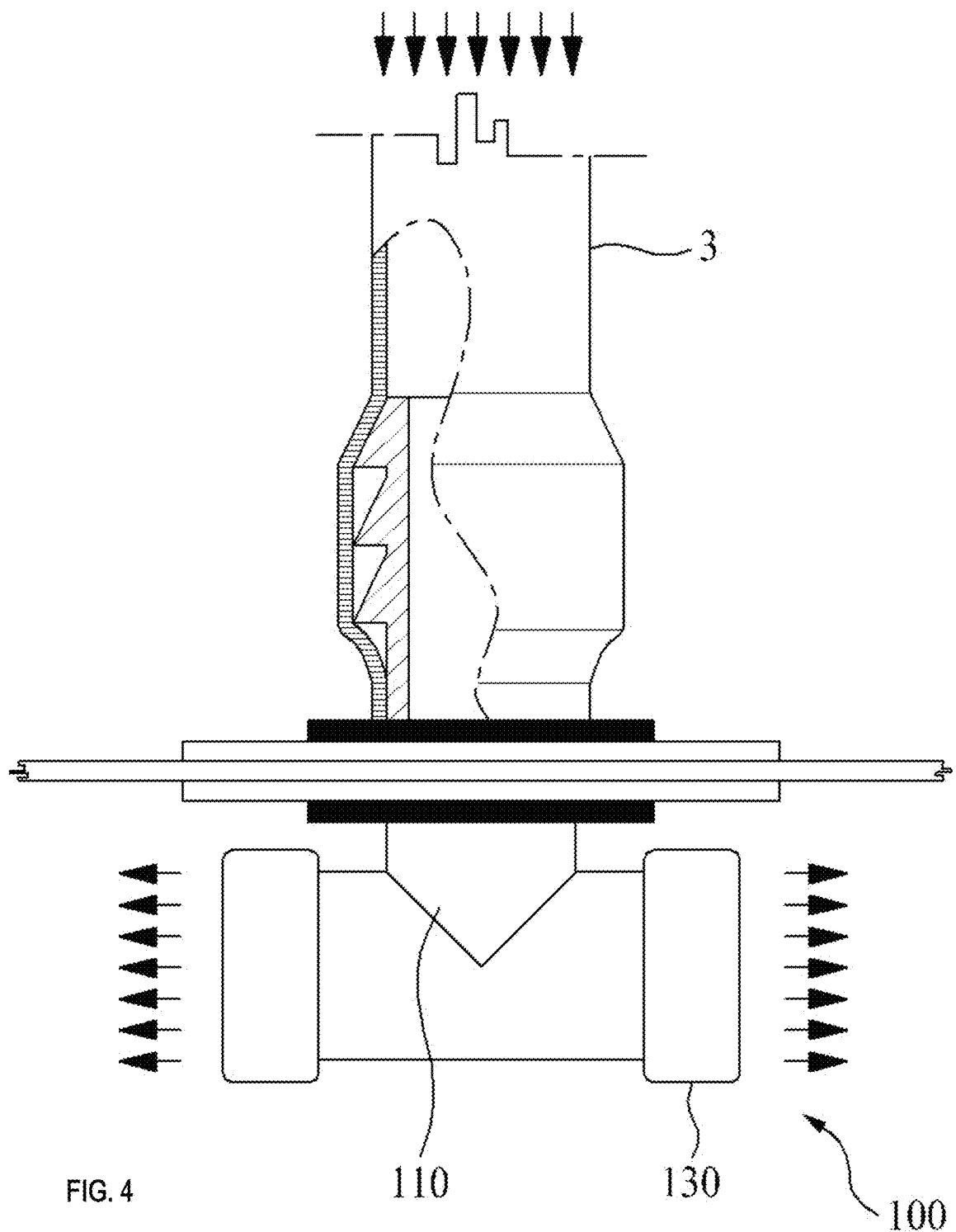
FIG. 4 is a diagram illustrating an divergence type inlet for filling slurry in a geotextile tube according to a first embodiment of the disclosure.

FIG. 4 is a diagram illustrating a divergence type (T-type) inlet for filling slurry in a geotextile tube according to a first embodiment of the disclosure.

The divergence type inlet (referred to as "T-type inlet") 100 for filling the slurry in the geotextile tube according to the first embodiment of the disclosure includes a main body 110 and an outlet 130.

The main body 110 has a tube shape for flowing dredge soil along therein, with an open top.

The outlet 130 is provided in a lower portion of the main body 110 in a lateral direction and the lower portion of the main body 110 having the outlet 130 can be inserted in the tube structure 1 via an inlet 2 formed in the tube structure 1.

At this time, it is preferred that two or more outlets 130 projected a preset length along both lateral directions of the main body 110 are provided.

A top of the main body 110 exposed to the tube structure 1 is connected to a min hose 3 where the dredge soil is introduced. Although not shown in detail, the main hose 3 and the main body 110 may be connected by a clamp FIG. 5 is a diagram illustrating dredge soil injected into the geotextile tube via a divergence type (T-type) inlet for filling dredge soil in the geotextile tube according to the first embodiment of the disclosure.

Figure 5:
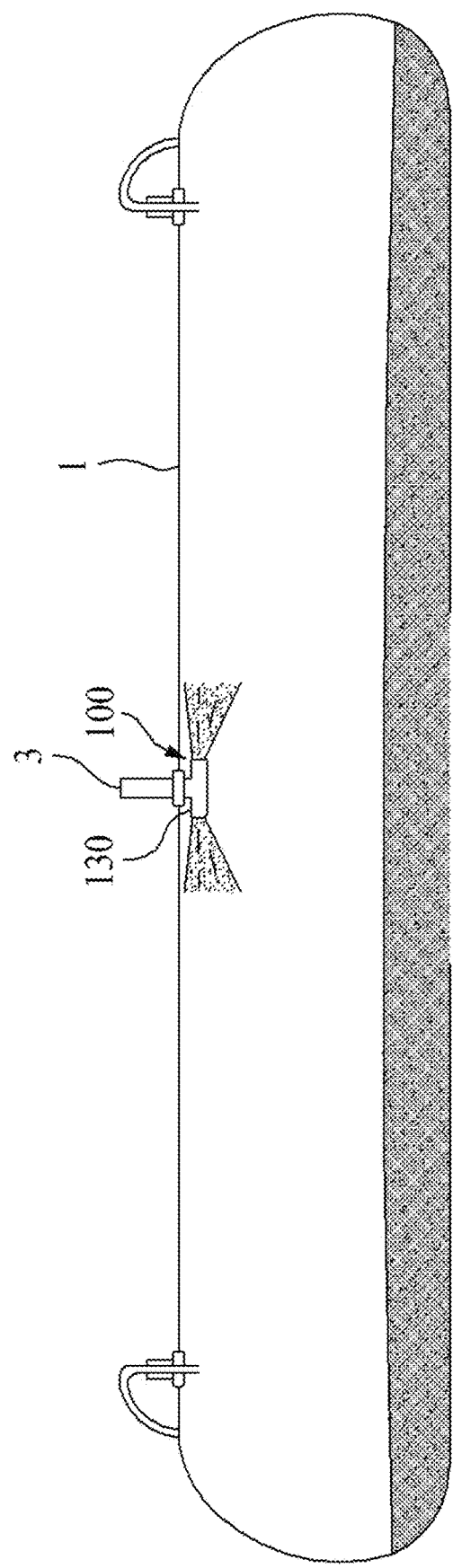
FIG. 5 is a diagram illustrating dredge soil injected into the geotextile tube via a divergence type inlet for filling dredge soil in the geotextile tube according to the first embodiment of the disclosure.

As shown in FIG. 5, the divergence type inlet for filling the slurry in the geotextile tube according to the first embodiment is installed in an installation hole for the slurry filling inlet which is formed in an upper portion of the geotextile tube 1.

When filling the slurry along the delivery hose 3, the pressurized slurry will be deflected by the T-type inlet into two opposing directions along the longitudinal direction of the geotextile tube.

In the process the slurry is jetted at a longer range dissipating its kinetic energy before colliding with the base of the geotextile tube, hence reduces the magnitude of impact force of the spurted slurry to the geotextile wall thereby minimizing the tensile force on the transverse and axial direction.

Since the slurry will be jetted at a longer range, the solid materials will be distributed further at the ends of the geovinyl-tube, increasing the amount of sediment deposits at the ends.

Figure 6:
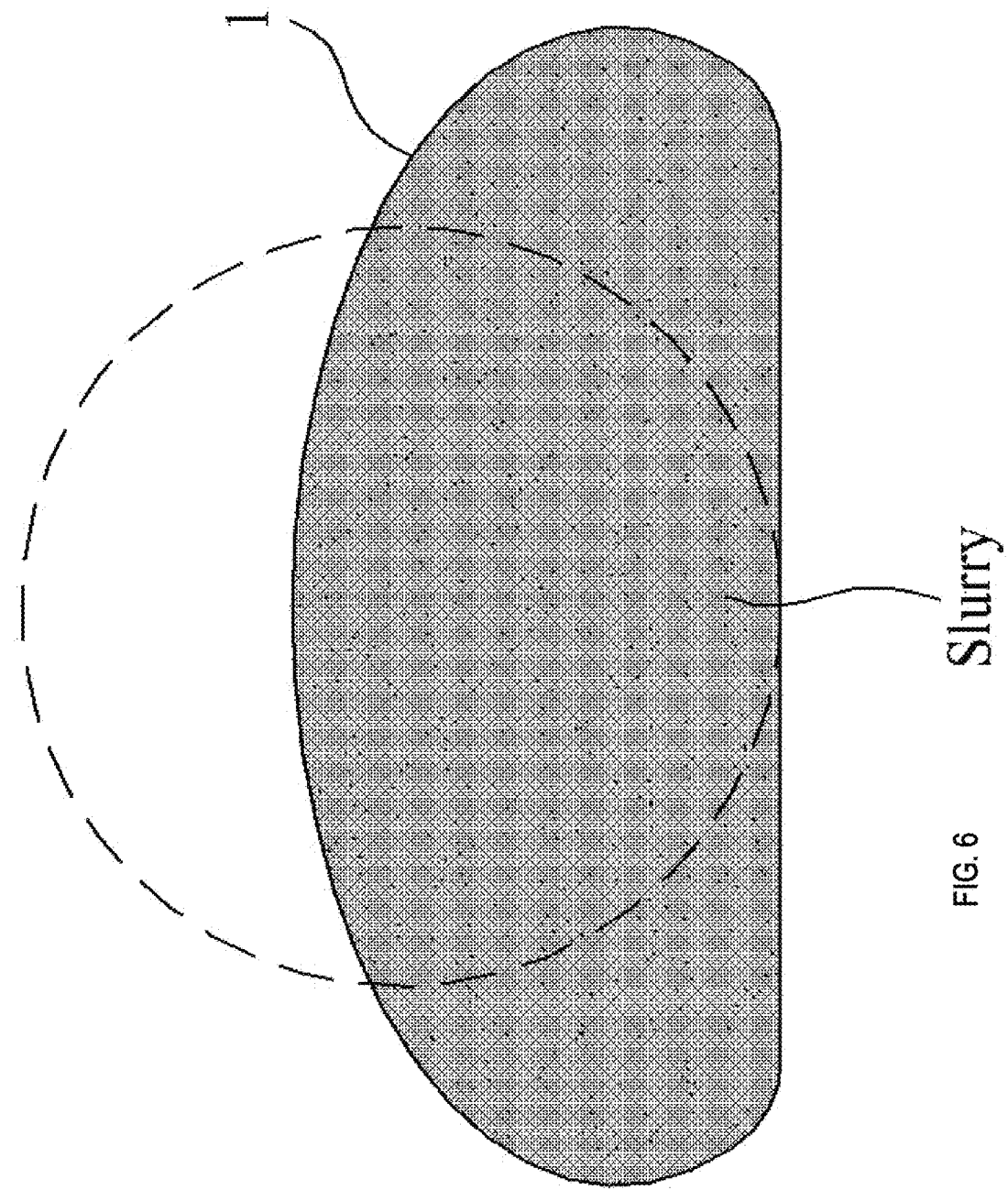
FIG. 6 is a traverse sectional diagram illustrating the dredge soil injected via the divergence type inlet for filling dredge soil in the geotextile tube according to the first embodiment of the disclosure.

In the experimental tests conducted using a T-shaped inlet system, the deposition of sediments on the geovinyl-tube showed a nearly leveled height throughout (see FIG. 5). The actual soil deposition is shown in FIG. 6.

After the tube tests, a laboratory test was conducted to determine the water content distribution of the soil fill along each section of the geovinyl-tube.

Figure 7:
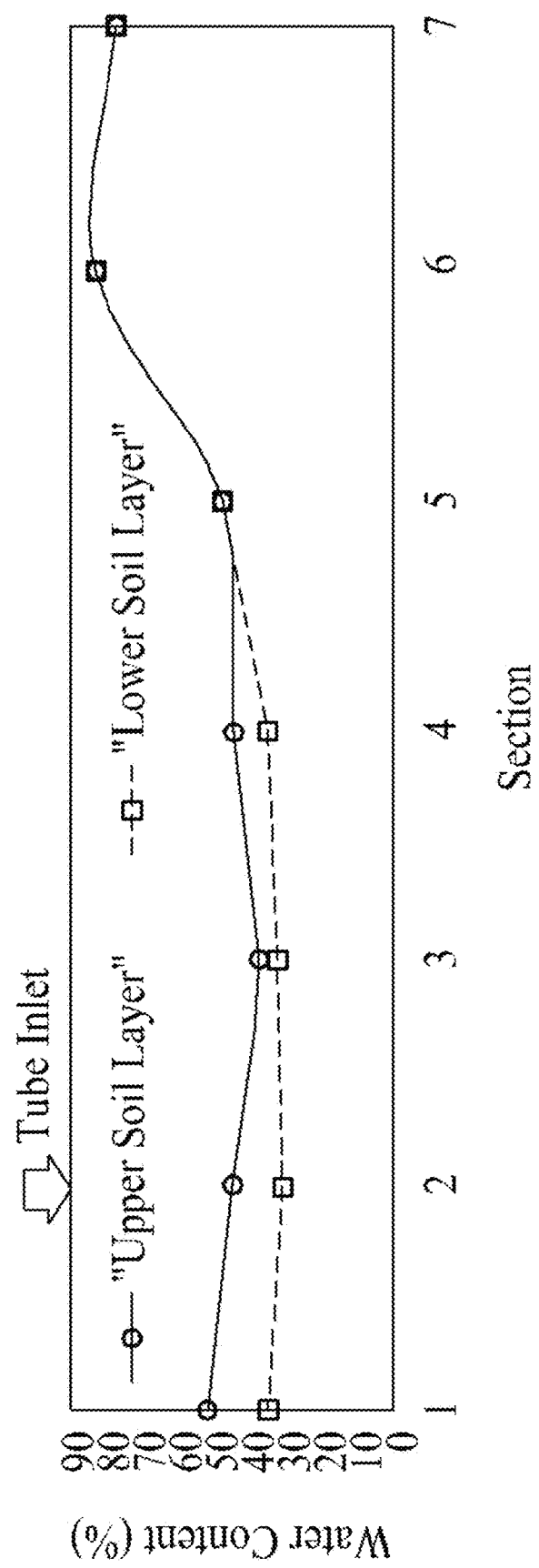
FIG. 7 is a graph illustrating deposition of sediments in the slurry injected via the I-type inlet for filling slurry in the conventional geotextile tube.

For Case 1, it can be seen in FIG. 7 that there is a variation of water contents (5~20% difference) between the upper and lower sediment layers along the 4 sections near the inlet and a uniform water content distribution on the remaining sections farther from the tube's inlet.

Figure 8:
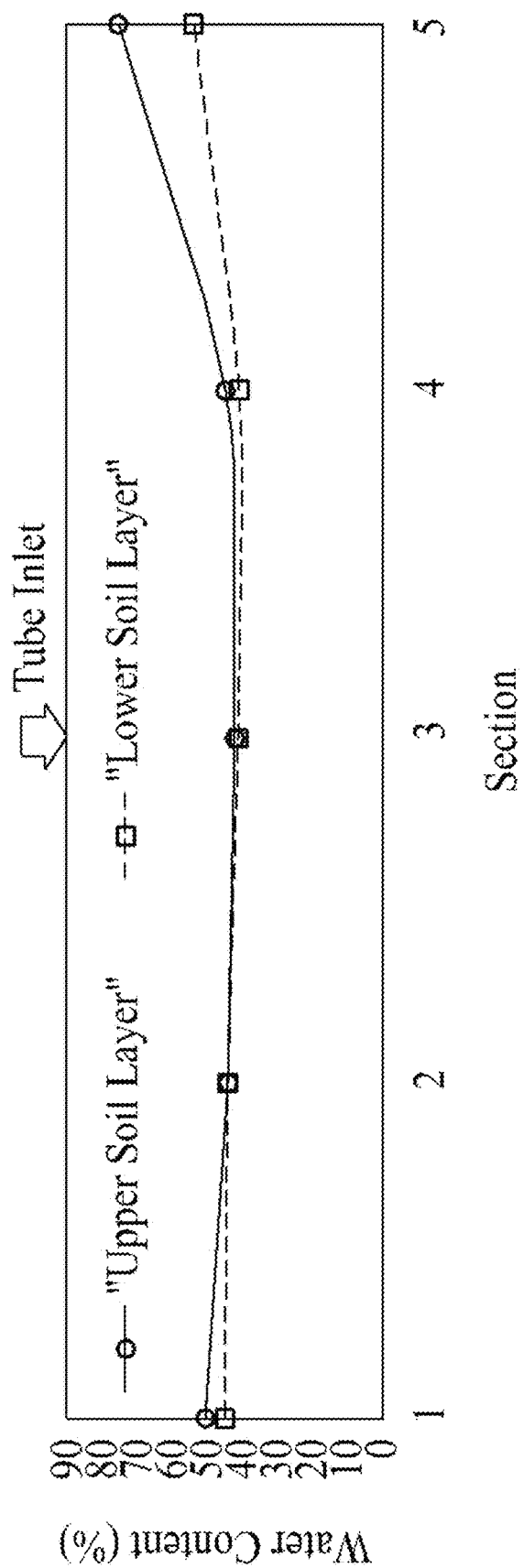
FIG. 8 is a graph illustrating deposition of sediments in the slurry injected via the divergence type inlet for filling slurry in the conventional geotextile tube.

However, for Case 2 shown in FIG. 8 which fills the slurry in the geotextile tube, using the divergence type inlet for filling the slurry according to the first embodiment of the disclosure, it can be seen that there is an almost uniform distribution of water contents on the upper and lower soil layers at each tube section of the tube (0~5% difference), with the exception of section 5, where a difference of ~20%.

It should be noted that it is essential to have a good soil fill distribution along the geotextile tube as it affects the strength capacity of the tube entity. For example, the shear strength and bearing capacity of the soil deposits with low moisture contents are higher than the shear strength and bearing capacity of those with high moisture contents.

Two kinds of divergence type inlets are presented designated as Plain T-type and Curved T-type (Y-type) inlets. The main purpose of using the T-type inlet is to deflect the flow of the slurry jet and avoid a direct impact normal to the transverse section of the geovinyl tube.

Figure 9:
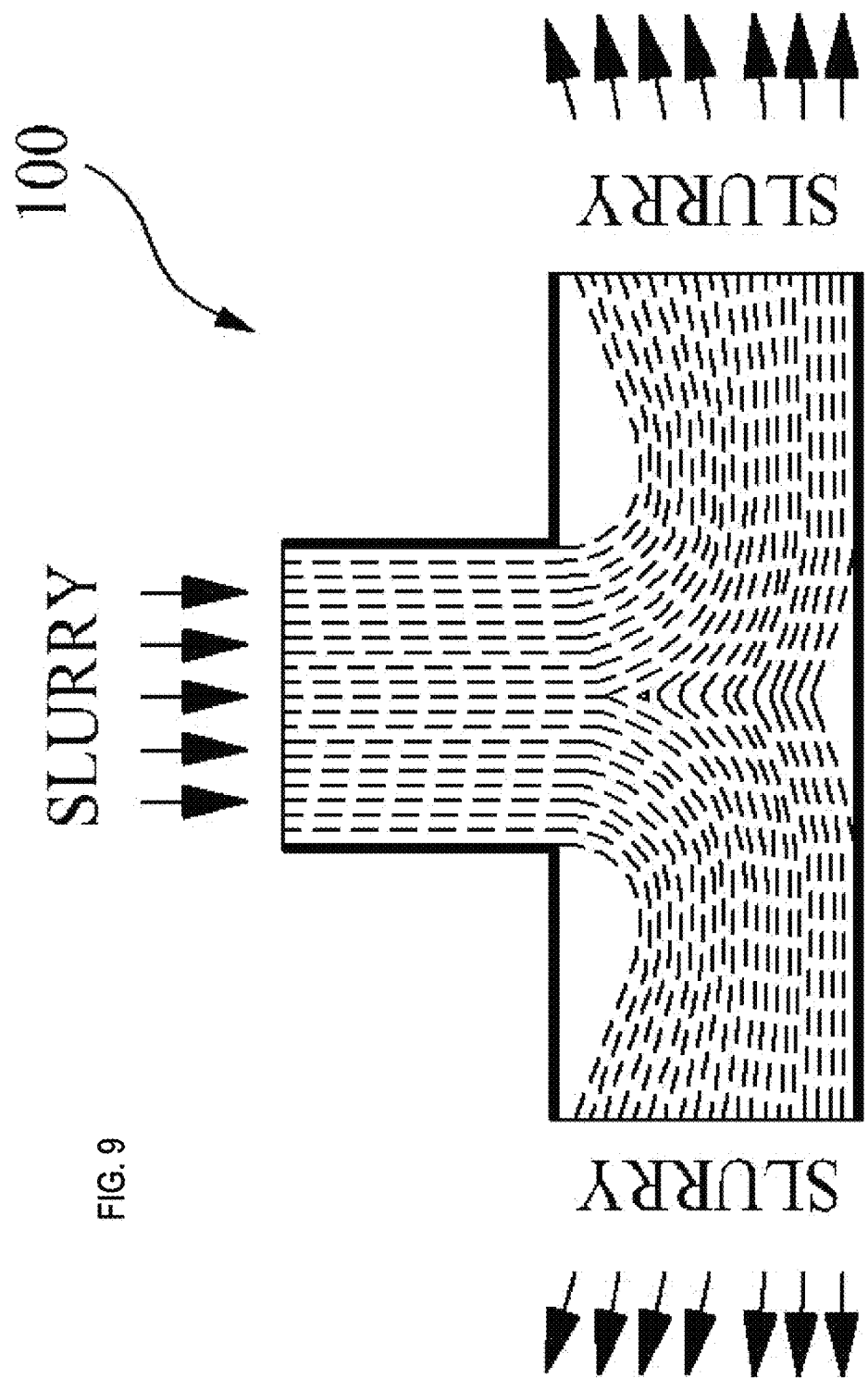
FIG. 9 is a diagram schematically illustrating slurry is flowing when using the divergence type inlet for filling slurry in the geotextile tube.

However, it is still desirable to propel the slurry at longer span along the axial direction of the tube to achieve an even sediment distribution. The bend on the T-type inlet compels to deflect the stream of slurry where it consequently dissipates the kinetic energy of the flow. In the idealized flow diagram on FIG. 9, it can be observed that abrupt change in the direction of flow will produce some sort of a drag on the bends and as a result reducing the jet velocity. Hence, a new inlet system, the curved T-type (referred to as "Y-type") is introduced to maximize the efficiency of the slurry flow. In the idealized diagram shown in FIG. 11, the current flows smoothly along the bends thereby maintaining the jet velocity of the pressurized slurry fill.

FIG. 10 is a diagram illustrating the dredge soil injected via a branced inlet (Y-type inlet) for filling slurry in a geotextile tube according to a second embodiment of the disclosure.

The Y-type inlet 200 for filling slurry in the geotextile tube according to the second embodiment of the disclosure may also include a main body 210 and an outlet 230.

The main body 210 has a tube shape for flowing dredge soil along therein, with an open top.

The outlet 230 is provided in a lower portion of the main body 210 in a lateral direction and it has a connected portion with the main body 210 which has a Y-shape.

At this time, it is preferred that the connected portion between the main body 210 and the outlet 230 is flexibly curved.

Even in this case, an upper portion of the outlet 230 is connected with a delivery hose 3 for filling dredge soil from outside by a clamp.

Compared with the first embodiment disclosing the T-type inlet in which drastic flow change of the injected slurry can make the introduction speed resistance reduce the speed only to reduce the energy to inject soil particles, a new inlet system of the Y-type according to the second embodiment of the disclosure is introduced to maximize the efficiency of the slurry flow. In other words, the current flows smoothly along the bends thereby maintaining the jet velocity of the pressurized slurry fill.

Not shown in the drawings in detail, the outlet according to the embodiments of the disclosure may be formed of a flexible material. Moreover, a pressure sensor may be provided in the outlet 130 and 230 to secure the security when filling the dredge soil.

It will be apparent to those skilled in the art that various modifications and variations can be made in the present disclosure without departing from the spirit or scope of the disclosed subject matter.

Thus, it is intended that the present disclosure cover the modifications and variations of the disclosed subject matter provided they come within the scope of the appended claims and their equivalents.

What is claimed is:

1. A divergence type filling port for a geotextile tube, comprising:
   a main body having an upper portion configured for coupling to a main hose to enable injection of dredge soil into the main body, the main body extending from the upper portion to a lower portion inserted in the geotextile tube and extending a distance past an inner surface of the geotextile tube; and
   a plurality of outlets provided in the lower portion of the main body to exhaust injected dredge soil into the geotextile tube in a lateral direction defined by a longitudinal axis of the geotextile tube, wherein the outlets are bent away from an axis of the main body so that the plurality of outlets face away from the lower portion of the main body in the lateral direction to enable injected dredge soil to exit the main body in the lateral direction.

2. The divergence type filling port of claim 1, wherein the outlets are bent in a perpendicular direction with respect to the main body.

3. The divergence type filling port of claim 1, wherein the outlets are formed of a flexible material.

4. The divergence type filling port of claim 1, wherein the outlets are downwardly inclined at a preset angle from the main body.

5. The divergence type filling port of claim 2, wherein a connected portion between the main body and the outlet is curved.

6. The divergence type filling port of claim 1, wherein the filling port includes two outlets configured to expel injected dredge soil in opposing directions.

7. A divergence type filling port for a geotextile tube, comprising:
   a main body with an upper portion configured for coupling to a main hose to enable injection of dredge soil into the main body, the upper portion being disposed external to the geotextile tube and the main body extending from the upper portion to a lower portion, the lower portion extending into the geotextile tube a distance past an inner surface of the geotextile tube; and
   a plurality of outlets provided in the lower portion of the main body to exhaust injected dredge soil into the geotextile tube in a lateral direction defined by a longitudinal axis of the geotextile tube, wherein the outlets are bent at a preset angle in a lateral direction with respect to the main body.

8. The divergence type filling port of claim 7, wherein the outlets are bent in a perpendicular direction with respect to the main body.

9. The divergence type filling port of claim 7, wherein the outlets are formed of a flexible material.

10. The divergence type filling port of claim 7, wherein a connected portion between the main body and the outlet is curved.

11. The divergence type filling port of claim 7, wherein the filling port includes two outlets configured to expel injected dredge soil in opposing directions.

12. A divergence type filling port for a geotextile tube, comprising: a main body with an upper portion configured for coupling to a main hose to enable injection of dredge soil into the main body, the upper portion being disposed external to the geotextile tube and the main body extending from the upper portion to a lower portion, the lower portion extending into the geotextile tube a distance past an inner surface of the geotextile tube; and a plurality of outlets provided in the lower portion of the main body to exhaust injected dredge soil into the geotextile tube in a lateral direction defined by a longitudinal axis of the geotextile tube, wherein the outlets are biased toward the lateral direction so as to enable injected dredge soil to flow in the lateral direction as the dredge soil exits the main body; and wherein the outlets are bent in a perpendicular direction with respect to the main body.

13. The divergence type filling port of claim 12, wherein the outlets are formed of a flexible material.

14. The divergence type filling port of claim 12, wherein a connected portion between the main body and the outlet is curved.

* * * * *